United States Patent
Zhou (12)

(10) Patent No.: US 6,416,806 B1
(45) Date of Patent: Jul. 9, 2002

(54) HERBAL CAFFEINE REPLACEMENT COMPOSITION AND FOOD PRODUCTS INCORPORATING SAME

(76) Inventor: James H. Zhou, 32 Hallmark Dr., Wallingford, CT (US) 06492

( * ) Notice: Subject to any disclaimer, the term of this patent is extended or adjusted under 35 U.S.C. 154(b) by 0 days.

(21) Appl. No.: 09/528,547

(22) Filed: Mar. 20, 2000

(51) Int. Cl.[7] ............................. A23L 2/02; A23L 2/38
(52) U.S. Cl. ................. 426/590; 426/594; 426/638; 426/648; 424/195.1
(58) Field of Search .................. 426/590, 638, 426/648, 594; 424/195.1

(56) References Cited

U.S. PATENT DOCUMENTS 5,972,985 A * 10/1999 Thomas et al. ............. 514/400

FOREIGN PATENT DOCUMENTS

WO 99/61038 * 12/1999

* cited by examiner

Primary Examiner—Helen Pratt
(74) Attorney, Agent, or Firm—Bachman & Lapointe, P.C.

(57) ABSTRACT

A caffeine replacement composition including a first plant extract portion containing at least one flavoglycoside selected from the group consisting of quercetin, quercetagetin, ginkgetin, biloba, isorhamnetin, kaempferol, rutin, isoginkgetin, ginnol, and mixtures thereof; a second plant extract portion containing Ginkgolactones; and a third plant extract portion containing a component selected from the group consisting of puerarin, acetylpuerarin, puerarin-xyloside and combinations thereof. These extracts are preferably obtained from *Ginkgo biloba* and kudzu (Pueraria).

44 Claims, No Drawings

HERBAL CAFFEINE REPLACEMENT COMPOSITION AND FOOD PRODUCTS INCORPORATING SAME

BACKGROUND OF THE INVENTION

Coffee is heavily consumed around the world for various reasons, one of which is the enhanced alertness provided by the caffeine contained in coffee. Unfortunately, caffeine is quite addictive.

Approximately 2.1 billion cups of coffee are consumed per day worldwide, with four hundred twenty million cups being consumed daily in the United States.

Numerous other products such as chocolate, cola, and the like also contain caffeine and are consumed in large quantities.

Studies have raised concerns about caffeine consumption and caffeine addiction can lead to suffering from tremors, headache, impulsiveness, poor performance, loss of focus, loss of self-control, mood swings, irritability, panic, insomnia, birth defects, agitation, depression, loss of color, haggard appearance, loss of appetite, gastric manifestations, acid reflux, heart palpitations, decrease of cerebral blood flow, memory loss and more.

One response to this type of problem has been the development of decaffeinated coffee. However, decaffeinated coffee does not provide the desired stimulant effects which are provided by caffeine, despite the above-listed disadvantages.

It is desirable to provide a product which provides the perceived benefits of caffeine in terms of stimulant effects or increased alertness, while avoiding some or all of the drawbacks commonly associated with caffeine.

It is therefore the primary object of the present invention to provide a caffeine replacement composition.

It is a further object of the present invention to provide such a composition which provides for increased alertness over relatively extended periods of time.

It is a still further object of the present invention to provide various food products including beverages, chocolate and the like which have alertness enhancing qualities without the known drawbacks of caffeine.

Other objects and advantages of the present invention will appear herein below.

SUMMARY OF THE INVENTION

In accordance with the present invention, the foregoing objects and advantages have been readily attained.

According to the invention, a caffeine replacement composition is provided, which comprises *Ginkgo biloba* extract and kudzu extract. The *Ginkgo biloba* extract preferably contains flavoglycosides and terpene lactones at particular ratios of one to the other. The kudzu extract preferably comprises standardized extract containing puerarin.

Numerous additional ingredients can be incorporated into the composition for additional benefits and/or flavor reasons. For example, polyphenols can readily be incorporated into compositions and food products in accordance with the present invention.

In further accordance with the present invention, a liquid beverage composition is provided which comprises a liquid base suitable for human consumption, *Ginkgo biloba* extract and kudzu extract. The beverage composition may be in concentrated strength or in final beverage strength, and may further include a wide variety of additional ingredients.

DETAILED DESCRIPTION

The invention relates to a caffeine replacement composition and various food products such as beverages and the like which incorporate same.

As set forth above, a wide variety of food products include caffeine which is desirable to many people for the alertness enhancing affect of the caffeine. In light of the well documented disadvantages of caffeine and caffeine addiction, the present invention is intended to provide an herbal replacement which provides similar alertness enhancement without the disadvantages. Further, compositions are provided as coffee replacement compositions, both in concentrated and diluted or beverage-strength form, which possess substantially the same flavor characteristics as coffee and provide substantially similar alertness benefits through a combination of herbal extracts selected according to the invention.

In accordance with the present invention, the two critical ingredients to the caffeine replacement composition are *Ginkgo biloba* extract and kudzu extract which, in appropriate proportions and ratios to each other, serve to advantageously enhance alertness of a person consuming same, typically for approximately the same period of time as an equal serving of caffeine.

*Ginkgo biloba* is known to provide improved memory and cerebral circulation, and is also advantageous as an antioxidant. However, *Ginkgo biloba* does not provide any rapidly occurring alertness enhancement. Further, *Ginkgo biloba* has a very bitter taste and in high doses cannot be tolerated as an ingredient in beverages or other food products. For example, in a six ounce beverage, no more than about 20 milligrams of *Ginkgo biloba* can be tolerated in terms of taste.

Kudzu, which is also known as Pueraria, has a friendly taste and provides almost instant enhancement to alertness. However, this enhancement diminishes quickly and, depending upon the dose, can lose effect within about one half hour to one hour.

It has now been found in accordance with the present invention that a combination of *Ginkgo biloba* and kudzu advantageously serves to moderate the bitter flavor of *Ginkgo biloba*, and the combination serves to provide for an instant and sustained improvement in alertness. The composition according to the invention in typical strengths provides for enhanced alertness for about 2 to 6 hours. This makes the composition surprisingly well suited for use as a caffeine replacement in various food products, especially in a coffee replacement beverage.

The *Ginkgo biloba* extract portion of the present invention is preferably an extract which includes flavoglycosides and, more preferably, which also contains terpene lactones. These extracts can be obtained by a number of different extraction techniques which are well known to the person of ordinary skill in the art. Preferred *Ginkgo biloba* extract contains at least about 2% wt. of said flavoglycosides and at least about 0.05% wt. of said terpene lactones. An ideal *Ginkgo biloba* extract in accordance with the present invention is a standardized *Ginkgo biloba* extract containing between about 10% and about 40%, preferably 24% wt. flavoglycosides, and between about 1% and about 15%, preferably 6% wt. terpene lactones, with the balance consisting of various other crude plant extract material.

The *Ginkgo biloba* extract preferably contains flavoglycosides and terpene lactones at a ratio by weight of flavoglycosides to terpene lactones of between about 0.1 and 100, more preferably between about 0.4 and about 40, still more preferably between about 1 and about 10 and ideally about 4.

The flavoglycosides or flavonoids which are particularly desirable include quercetin, quercetagetin, ginkgetin, biloba, isorhamnetin, kaempferol, rutin, isoginkgetin, ginnol and combinations thereof. The most preferred flavonoids are quercetin, quercetagetin and ginkgetin, preferably in combination.

One excellent source of the desired materials is *Ginkgo biloba*, which is the preferred plant source for obtaining the desired extract. Of course, a number of these flavoglycosides can be obtained from other sources as well. For example, quercetin can be obtained from Crataegus, Aster, Rhododendron, Tagopyrum, Magnolia, Salix, *Zea mays*, Euphoria and the like. Quercetagetin is a derivative of quercetin and can be obtained from the foregoing sources and also Tagetes and Lotus.

The terpene lactones of the present invention are advantageously Ginkgo lactones, most preferably Ginkgolide A, Ginkgolide B, Ginkgolide C, Ginkgolide D, Ginkgolide M and combinations thereof, and *Ginkgo biloba* is an excellent source of these materials.

The kudzu extract is preferably a standardized extract of kudzu which contains at least about 0.1% wt. of puerarin based upon total weight of extract. More preferably, the kudzu extract includes between about 0.1% and about 90% wt. puerarin, and ideally about 30% wt. of puerarin. The kudzu extract is also obtained using extraction techniques which are readily known to the person of ordinary skill in the art.

The kudzu extract contains puerarin, acetylpuerarin and puerarin-xyloside which advantageously contribute to the alertness enhancing qualities of the present invention. These materials are collectively referred to herein as puerarin. These materials are present in extracts of the pueraria or kudzu family, specifically from *Pueraria lobata, Pueraria tuberosa, Pueraria edulis, Pueraria omeiensis, Pueraria thomsoni, Pueraria phaseoloides* and others. These are collectively referred to herein as kudzu or pueraria. *Pueraria lobata* is the most preferred source material.

It should be appreciated that the composition of the present invention advantageously contains three important plant extract portions. These are a first plant extract portion containing the desired flavoglycosides, a second plant extract portion containing Ginkgolactones and a third plant extract portion containing the desired puerarin.

The composition in accordance with the present invention which has been found to serve well as a caffeine replacement composition preferably has a ratio by weight of *Ginkgo biloba* extract to kudzu extract of between about 0.1 and about 4, more preferably between about 1 and about 3, and ideally about 1.

The composition in accordance with the present invention can be a simple mechanical mixture of the ingredients, in dry or liquid form, or could advantageously be combined as source materials before the extraction process such that a single extraction process provides the desired combination.

The composition of the present invention may advantageously include additional ingredients which can be incorporated for the purposes of increasing anti-oxidant content, for providing energy boosting affects, improvement in circulation, or flavor support. For example, it is desirable to incorporate polyphenols most preferably from green tea, grapes and/or grape seeds, which serve to enhance the anti-oxidant component in accordance with the invention.

Resveratrol is also a useful ingredient and can be obtained from botanical sources or plant source materials such as knotweed (Polygonum), grapes, grape seeds and the like. Some additional useful ingredients include one or more of the following: Dong Quai (Angelica), Ginger, Ginseng, Shisandra, Lycium, Liriope, Chinese blackberry (*Rubus suavisimus*), Lotus (*Nelumbo nucifera*), *Rehmannia glutinosa, Paeonia lactiflora*, Cinnamomum, Fennel, Jujube, Trifoliate Orange, Orange peel, Hawthorn, Ephedra, Alisma, Plantago, Codonopsis, Astragalus, Licorice, Epimedium and combinations thereof. These source materials provide extracts containing desirable flavors, energy boosting ingredients, circulation enhancing properties and the like, many in combination with additional anti-oxidants.

Anti-oxidant providing ingredients can be incorporated into the composition of the present invention in a wide range of amounts. Preferably, polyphenol is obtained from green tea, grapes and/or grape seeds and can be included in the composition of the present invention from very small or trace amounts up to relatively large amounts. For example, compositions can usefully be prepared in accordance with the present invention having a ratio by weight of polyphenols to *Ginkgo biloba* extract of between about 75:1 and about 1:50.

Similarly, resveratrol-containing components can be included in the composition of the present invention in amounts sufficient to provide a broad range of ratios of resveratrol to *Ginkgo biloba* extract. Preferably, compositions can be provided in accordance with the present invention having a ratio by weight of resveratrol to *Ginkgo biloba* extract of between about 1 and about 5.

The composition of the present invention can also include additional flavors, most advantageously caffeine free flavors, and depending upon the intended use of the composition, additional flavors such as fruit, mint, cream and the like can be readily incorporated.

Also depending upon the intended use of the composition, a sweetening component can be incorporated. Sweetening component could be incorporated in the form of conventional natural sugar or other natural or artificial sweetener. It is preferred, however, that if sweetening is desired, that natural sweetening composition be used such as terpene glycosides which can be extracted from Momordica, Rubus, and/or the Stevia families. These compositions when extracted and blended appropriately can provide an extremely satisfying sweet flavor profile without the undesirable characteristics of other conventionally available natural and artificial sweeteners.

The composition may advantageously be provided as a simple caffeine replacement, without other ingredients, or could be incorporated into food products in "ready to serve" condition, or still further could be incorporated into concentrated liquids and the like which can readily be diluted in order to provide a final beverage or other food product. Further, the composition can be provided in tablet form for use as an alertness enhancing product such as the caffeine based products currently available. Thus, the composition of the present invention has a wide range of useful applications in the food and personal products industries.

One particularly advantageous embodiment of the present invention is to incorporate the composition into a liquid beverage composition which includes a liquid base suitable for human consumption and the *Ginkgo biloba* and kudzu extracts according to the invention. In such a liquid beverage composition, the *Ginkgo biloba* extract and kudzu extract are preferably present in the ratios as set forth above.

In this embodiment, the liquid base may either be a concentrated base whereby the composition is diluted to the proper strength before consumption as a beverage, or the composition may be in final or "beverage-strength", which is then ready for consumption.

In a liquid concentrated form, the *Ginkgo biloba* extract may suitably be present in an amount of between about 10 and about 300 mg per milliliter of the concentrated liquid base, and the kudzu extract is preferably present in an amount of between about 15 and 1000 mg per milliliter of the concentrated base. Such a composition can advantageously be diluted, for example by mixing 1 milliliter or an appropriate amount of liquid concentrate with eight ounces of additional liquid, for example water, so as to provide a final consumable liquid beverage which is substantially caffeine free and which nevertheless provides the alertness enhancing benefits normally sought through caffeine.

Depending upon strength of the concentrate, it is preferred to dilute with sufficient additional liquid to provide a "beverage-strength" liquid composition containing *Ginkgo biloba* extract in an amount between about 10 and about 300 mg per eight ounces of the "beverage-strength" liquid, and containing the kudzu extract in an amount between about 15 and 1000 mg per eight ounces of the beverage-strength liquid.

The liquid beverage composition of the present invention is particularly well suited to use in preparation of a coffee-replacement composition, and in such case the liquid base preferably comprises glycerine, a substantially caffeine free liquid coffee flavor extract and water. The glycerine portion of the liquid base is preferably present in an amount between about 0.1% and about 30% by volume with respect to the liquid base. The coffee flavor extract is preferably present in an amount greater than about 0.25% vol., preferably between about 50% and about 90% volume based upon the volume of the liquid base. Water preferably forms the balance, which may be present in an amount between about 1% and about 20% volume based upon the liquid base volume.

The liquid coffee flavor extract can be any readily obtainable coffee extract which is known to a person of ordinary skill in the art. One example of a particularly suitable substantially caffeine free coffee flavor extract is natural coffee flavor number 37523 available from Carmi Flavor & Fragrance Co., Inc. in City of Commerce, Calif.;. Chicory and other materials also provide pleasing taste.

A number of examples of particularly suitable compositions according to the invention will now be listed below as Examples 1–6.

EXAMPLE 1

Sweetened Liquid Concentrate

In a liquid base that contains 0.1–30% (vol. glycerine, 50–80% vol. liquid coffee flavor and 1–20% vol. water, the following herbal extracts are mixed:
 a. 10–60 mg/ml standardized *Ginkgo biloba* extract (24% wt. flavoglycosides and 6% wt. terpene lactones);
 b. 5–35 mg/ml Rhemannia extract;
 c. 3–30 mg/ml Knotweed extract;
 d. 0.5–10 mg/ml panax ginsenoside;
 e. 15–100 mg/ml kudzu extract;
 f. 5–60 mg/ml Schizantra extract;
 g. 5–100 mg/ml polyphenols from green tea;
 h. 10–80 mg/ml intensive sweetening terpene glycoside.

EXAMPLE 2

Non-sweetened Liquid Concentrate

In a liquid base that contains 0.1–30% vol. glycerine, 50–80% vol. liquid coffee flavor and 1–20% vol. water, the following herbal extracts are mixed:
 a. 10–60 mg/ml standardized *Ginkgo biloba* extract (24% wt. flavoglycosides and 6% wt. terpene lactones);
 b. 5–35 mg/ml Don Quai (Angenica) extract;
 c. 5–80 mg/ml Horny goat weed (Epimedium) extract;
 d. 3–30 mg/ml Knotweed extract;
 e. 0.5–10 mg/ml panax ginsenoside;
 f. 15–100 mg/ml kudzu extract;
 g. 5–60 mg/ml Schizantra extract;
 h. 5–100 mg/ml polyphenols from green tea.

EXAMPLE 3

Granular Form Composition a. 2–10% wt. fructose or other form of sugar;
 b. 5–36% wt. flavor including coffee and/or sweetening flavors;
 c. 10–20% wt. sugar alcohol such as erythritol, dextrose or other carbohydrates;
 d. 1–6% wt. standardized *Ginkgo biloba* extract (24% wt. flavoglycosides and 6% wt. terpene lactones);
 e. 0.5–3.5% wt. Rhemannia extract;
 f. 0.3–3.090 knotweed extract;
 g. 0.05–1.0% wt. panax ginsenoside;
 h. 1.5–10% wt. kudzu extract;
 i. 0.5–6.0% Schizana extract;
 j. 0.05–10% wt. polyphenols from green tea.

EXAMPLE 4

Sweetened Liquid Concentrate

In a liquid base that contains 0.1–30% vol. glycerine, 50–90% vol. liquid coffee flavor and 1–20% vol. water, the following herbal extracts are mixed:
 a. 10–180 mg/ml standardized *Ginkgo biloba* extract (24% wt. flavoglycosides and 6% wt. terpene lactones);
 b. 5–35 mg/ml Rhemannia extract;
 c. 3–30 mg/ml Astragalus extract;
 d. 0.5–10 mg/ml panax ginsenoside;
 e. 15–250 mg/ml kudzu extract;
 f. 5–60 mg/ml Schizantra extract;
 g. 5–100 mg/ml polyphenols from grape seed extract;
 h. 10–80 mg/ml intensive sweetening terpene glycoside.

EXAMPLE 5

Non-sweetened Liquid Concentrate

In a liquid base that contains 0.1–30% vol. glycerine, 50–90% vol. liquid coffee flavor and 1–20% vol. water, the following herbal extracts are mixed:
 a. 10–180 mg/ml standardized *Ginkgo biloba* extract (24% wt. flavoglycosides and 6% wt. terpene lactones);
 b. 5–35 mg/ml *Paeonia lactiflora* extract;
 c. 3–30 mg/ml Cinnamon extract;
 d. 0.5–10 mg/ml panax ginsenoside;

e. 15–300 mg/ml kudzu extract;
f. 5–60 mg/ml Schizantra extract;
g. 5–500 mg/ml polyphenols from grape seed extract.

EXAMPLE 6

Sweetened Liquid Concentrate

In a liquid base that contains 0.1–30% vol. glycerine, 50–90% vol. liquid coffee flavor and 1–20% vol. water, the following herbal extracts are mixed:

a. 10–250 mg/ml standardized *Ginkgo biloba* extract (24% wt. flavoglycosides and 6% wt. terpene lactones);
b. 5–35 mg/ml Codonopsis extract;
c. 3–10 mg/ml Fennel extract;
d. 3–30 mg/ml Alisma extract;
e. 0.5–10 mg/ml panax ginsenoside;
f. 15–800 mg/ml kudzu extract;
g. 5–60 mg/ml Ginger extract;
h. 5–750 mg/ml polyphenols from grape seed extract;
i. 10–80 mg/ml intensive sweetening terpene glycoside.

Each of the above examples sets forth advantageous specific coffee replacement compositions in accordance with the invention. It should be noted that the concentrated liquid compositions are ideally suited to dilution by adding about 1 ml of the concentrate to about 8 ounces of additional liquid, for example hot water. In this way, a concentrated liquid coffee replacement can be provided which need only be added to hot water so as to provide an excellent caffeine free replacement for coffee which provides desirable enhancement to alertness for extended periods of time.

Of course, other combinations of ingredients are possible in accordance with the invention depending upon the final product. For example, the caffeine-replacement composition of the present invention could suitably be incorporated into cola products, iced or hot tea, liquid or solid chocolate products and the like.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

I claim:

1. A caffeine replacement composition, comprising:
    a first plant extract portion containing at least one flavoglycoside selected from the-group consisting of quercetin, quercetagetin, ginkgetin, biloba, isorhamnetin, kaempferol, rutin, isoginkgetin, ginnol and mixtures thereof;
    a second plant extract portion containing Ginkgolactones; and
    a third plant extract portion containing a component selected from the group consisting of puerarin, acetylpuerarin, puerarin-xyloside and combinations thereof wherein said first plant extract portion and said second plant extract portion in combination are present at a ratio by weight of said combination to said third plant extract portion of between about 0.1 and about 4.

2. The composition according to claim 1, wherein said first plant extract portion comprises quercetin, quercetagetin and ginkgetin.

3. The composition according to claim 1, wherein said first plant extract portion is an extract of *Ginkgo biloba*, Crataegus, Aster, Rhododendron, Tagopyriam, Magnolia, Salkiz, *Zea mays*, Euphoria, Tagetes, Lotus arid combinations thereof.

4. The composition according to claim 1, wherein said first plant extract portion and said second plant extract portion are extracts of *Ginkgo biloba*.

5. The composition according to claim 1, wherein said third plant extract portion is extract of kudzu.

6. The composition according to claim 1, wherein said second plant extract portion contains Ginkgolactones selected from the group consisting of Ginkgolide A, Ginkgolide B, Ginkgolide C, Ginkgolide D, Ginkgolide M and combinations thereof.

7. A caffeine replacement composition, comprising *Ginkgo biloba* extract and kudzu extract wherein said *Ginkgo biloba* extract and said kudzu extract are present at a ratio by weight of said *Ginkgo biloba* extract to said kudzu extract of between about 0.1 and about 4.

8. The composition according to claim 7, wherein said *Ginkgo biloba* extract contains flavoglycosides.

9. The composition according to claim 8, wherein said *Ginkgo biloba* extract further contains terpene lactones.

10. The composition according to claim 7, wherein said *Ginkgo biloba* extract is a standardized extract containing flavoglycosides and terpene lactones at a ratio by weight of said flavoglycosides to said terpene lactones of between about 0.1 and about 100.

11. The composition according to claim 10, wherein said ratio is between about 1 and about 10.

12. The composition according to claim 10, wherein said ratio is about 4.

13. The composition according to claim 7, wherein said kudzu extract comprises standardized extract containing at least about 0.1% wt. of puerarin based upon total weight of said kudzu extract.

14. The composition according to claim 13, wherein said standardized extract contains between about 0.1% and about 90% wt. of said puerarin.

15. The composition according to claim 13, wherein said standardized extract contains about 30% wt of said puerarin.

16. The composition according to claim 7, wherein said ratio is between about 1 and about 3.

17. The composition according to claim 7, wherein said ratio is about 1.

18. The composition according to claim 7, wherein said composition is in dry form.

19. The composition according to claim 7, further comprising a caffeine free coffee flavor extract.

20. The composition according to claim 7, further comprising a sweetener composition.

21. The composition according to claim 20, wherein said sweetener composition comprises terpene glycosides extracted from Momordica, Rubus, Stevia and combinations thereof.

22. The composition according to claim 7, further comprising polyphenols.

23. The composition according to claim 22, wherein said polyphenols are obtained from green tea, grape seeds and combinations thereof.

24. The composition according to claim 22, wherein said polyphenols are present in a ratio by weight of said polyphenols to said *Ginkgo biloba* extract of between about 25:1 and about 1:50.

25. The composition according to claim 7, further comprising resveratrol.

26. The composition according to claim 25, wherein said resveratrol comprises extract of a source plant material selecting from the group consisting of knotweed, grapes, grape seeds and combinations thereof.

27. The composition according to claim 25, wherein said resveratrol is present at a ratio by weight of said resveratrol to said *Ginkgo biloba* extract of between about 1 and about 5.

28. The composition according to claim 7, further comprising at least one additive selected front the group consisting of Dong Quai, Ginger, Ginseng, Shisaridra, Lycium, Liriope, Chinese Blackberry, Lotus, *Rehmannia glutinosa, Paeonia lactiflora*, Cinnamomum, Fennel, Jujube, Trifoliate Orange, Orange Peel, Hawthorn, Ephedra, Alisma, Plantago, Codonopsis, Astragalus, Licorice, Epimedium and combinations thereof.

29. A liquid beverage composition, comprising a liquid base suitable for human consumption; *Ginkgo biloba* extract; and kudzu extract wherein said *Ginkgo biloba* extract and said kudzu extract are present at a ratio by weight of said *Ginkgo biloba* extract to said kudzu extract of between about 0.1 and about 4.

30. The composition according to claim 29, wherein said *Ginkgo biloba* extract contains flavoglycosides.

31. The composition according to claim 29, wherein said *Ginkgo biloba* extract further contains terpene lactones.

32. The composition according to claim 29, wherein said *Ginkgo biloba* extract is a standardized extract containing flavoglycosides and terpene lactones at a ratio by weight of said flavoglycosides to said terpene lactones of between about 0.1 and about 100.

33. The composition according to claim 32, wherein said ratio is between about 1 and about 10.

34. The composition according to claim 32, wherein said ratio is about 4.

35. The composition according to claim 29, wherein said kudzu extract comprises standardized extract containing at least about 0.1% wt of puerarin based on weight of said kudzu extract.

36. The composition according to claim 35, wherein said standardized extract contains between about 0.1% and about 90% wt of said puerarin.

37. The composition according to claim 35, wherein said standardized extract contains about 30% wt of said puerarin.

38. The composition according to claim 29, further comprising a sweetener composition.

39. The composition according to claim 38, wherein said sweetener composition comprises terpene glycosides extracted from Momordica, Rubus, Stevia and combinations thereof.

40. A liquid beverage composition, comprising a liquid base suitable for human consumption; *Ginkgo biloba* extract; and kudzu extract wherein said liquid base is a concentrated base and said *Ginkgo biloba* extract is present in an amount between about 10 and about 300 mg per milliliter of said concentrated base, and said kudzu extract is present in an amount between about 15 and about 1000 mg per milliliter of said concentrated base.

41. A liquid beverage composition, comprising a liquid base suitable for human consumption; *Ginkgo biloba* extract; and kudzu extract wherein said liquid base is a beverage-strength liquid and said *Ginkgo biloba* extract is present in an amount between about 10 and about 300 mg per 8 ounces of said beverage-strength liquid, and said kudzu extract is present in an amount between about 15 and about 1000 mg per 8 ounces of said beverage-strength liquid.

42. A liquid beverage composition, comprising a liquid base suitable for human consumption; *Ginkgo biloba* extract; and kudzu extract wherein said liquid base comprises glycerine, liquid coffee flavor and water.

43. The composition according to claim 42, wherein said liquid base comprises 0.1–30% vol. of said glycerine, 50-90% vol. of said liquid coffee flavor and 1–20% vol. of said water based on total volume of said base.

44. The composition according to claim 42, wherein said liquid coffee flavor is selected from the group consisting of caffeine free liquid coffee extract, chicory and combinations thereof.

\* \* \* \* \*